United States Patent [19]

Dennert et al.

[11] 4,295,810
[45] Oct. 20, 1981

[54] APPARATUS FOR INSULATING BUILDING BLOCKS

[75] Inventors: Heinz Dennert, Bischberg; Hans V. Dennert, Schlüsselfeld, both of Fed. Rep. of Germany

[73] Assignee: Veit Dennert KG Baustoffbetriebe, Schlüsselfeld, Fed. Rep. of Germany

[21] Appl. No.: 45,732

[22] Filed: Jun. 5, 1979

[30] Foreign Application Priority Data

Jun. 10, 1978 [DE] Fed. Rep. of Germany ....... 2825508

[51] Int. Cl.³ .................. B29C 27/30; B29D 27/00
[52] U.S. Cl. ............................... 425/110; 52/309.12; 52/405; 264/40.2; 264/45.4; 264/109; 264/DIG. 7; 264/DIG. 10; 264/DIG. 11; 425/4 R; 425/145; 425/166
[58] Field of Search ............ 425/4 R, 145, 166, 110; 264/51, 45.4, 46.6, 109, DIG. 10, DIG. 11, 40.2; 52/309.4, 309.12, 309.13, 405, 743

[56] References Cited

U.S. PATENT DOCUMENTS

| | | | |
|---|---|---|---|
| 3,000,058 | 9/1961 | Thielen | 264/46.6 X |
| 3,075,240 | 1/1963 | Casavina et al. | 425/4 R |
| 3,259,677 | 7/1966 | Zwick | 264/126 |
| 3,301,927 | 1/1967 | Exley et al. | 264/46.6 X |
| 3,342,912 | 9/1967 | Northrup et al. | 264/51 |
| 3,871,801 | 3/1975 | Buchmann | 425/4 R |
| 3,885,363 | 5/1975 | Whittey | 52/405 X |
| 4,018,018 | 4/1977 | Kosuge | 52/309.4 X |

FOREIGN PATENT DOCUMENTS

| | | | |
|---|---|---|---|
| 2614512 | 10/1977 | Fed. Rep. of Germany | 52/309.4 |
| 2730075 | 1/1979 | Fed. Rep. of Germany | 264/46.6 |
| 2121369 | 8/1972 | France | 52/405 |
| 2307096 | 11/1976 | France | 52/405 |
| 43-16315 | 9/1968 | Japan | 264/45.4 |
| 400552 | 4/1966 | Switzerland | 264/45.4 |

*Primary Examiner*—Philip Anderson
*Attorney, Agent, or Firm*—Spencer & Kaye

[57] ABSTRACT

A building block having at least one chamber therein which is filled with a foamed plastic material consisting of particles interconnected at their surfaces to form gas-permeable interstices. The block is formed by filling the chamber with a loose fill of the foamed plastic material and then fusing the particles to each other by blowing hot gas through an injection lance inserted in the fill.

11 Claims, 6 Drawing Figures

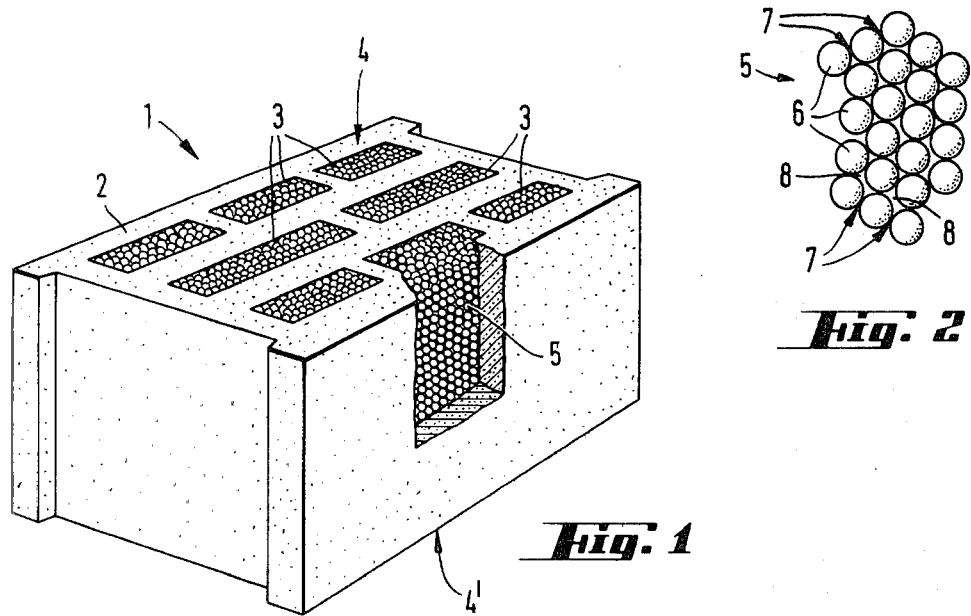
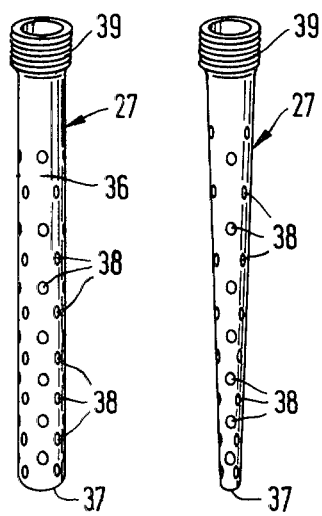
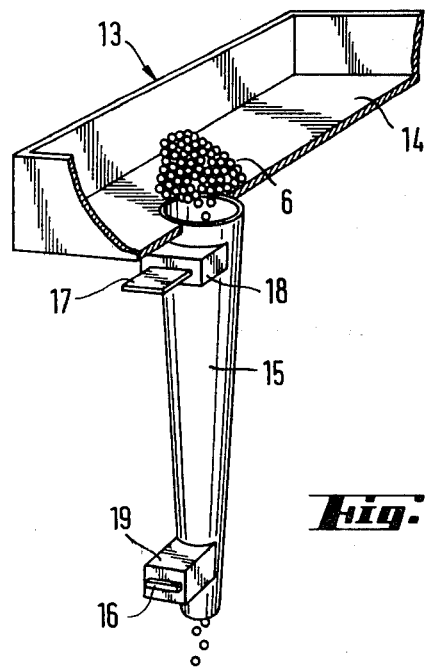

APPARATUS FOR INSULATING BUILDING BLOCKS

BACKGROUND OF THE INVENTION

The present invention relates to a hollow building block having one or a plurality of chambers distributed throughout the block. The chambers are open on at least one side and filled entirely or in part with foamed plastics which are anchored within the chamber walls. The invention further relates to a method for producing such hollow building blocks as well as to apparatus for manufacturing the blocks.

It is known to use hollow blocks to build walls, particularly sound and heat insulating walls. These blocks, which are of different sizes and made of various materials, usually have a plurality of regularly arranged chambers provided therein. The walls of the chambers are parallel to the outer walls of the block and the chambers generally extend within the interior of the block from load-bearing face to load-bearing face. The blocks are frequently made of grains of pumice stone which are bound together by means of cement. They may also be made of sand-lime bricks or other suitable materials such as clay or clay-containing masses which are molded and then hardened by firing.

The chambers penetrating the block lead to a significant savings in material and weight without substantially reducing the strength of the block. Moreover, due to the enclosed air spaces, the chambers cause the heat dissipation capability of the total block to be reduced and consequently its insulating capacity to be increased.

It is known to improve the heat and particularly the sound insulating capability of such blocks by filling the chamber cavities with heat or sound damping insulating material, as disclosed in German Pat. No. 1,708,765. The material may be, for example, a compact, foamed substance of synthetic resin which is attached tightly to the chamber walls by pressing prefabricated foamed pieces into the blocks or by foaming in the substance without the formation of cavities. The improvement in the heat and sound insulating properties obtained with such insulating fills, particularly foamed fills, is considerable.

However, blocks filled with such compact foamed material are disadvantageous in that their gas or vapor permeability is greatly reduced compared to unfilled hollow building blocks. Consequently, condensate is formed in the wall structure of such blocks, particularly as a result of the accumulation of moisture. Comparative measurements have shown that the vapor diffusion resistance factor, which for commercially available hollow building blocks of cement-bound pumice lies between 5 and 10, increases to from 40 to 140, with an average of about 70, when compact foamed polystyrene plates are built in. This means that the diffusion resistance is less favorable by a factor of about 10.

It is an object of the present invention to provide apparatus for producing a building block whose heat insulating capability is increased as compared to a conventional, unfilled hollow building blocks of the same material but without the gas or vapor diffusion factor being significantly impaired.

SUMMARY OF THE INVENTION

In accordance with the invention, a hollow building block having one or a plurality of chambers which are open on at least one side and distributed throughout the block are filled entirely or in part with foamed plastics which are anchored to the chamber walls. The hollow building block is characterized by the fact that the plastic fill consists of particles which are connected together on their surfaces leaving gas permeable interstices therebetween. It has been found to be of particular advantage to provide this plastic fill in the form of prefoamed polystyrene beads which are fused together at the points where their surfaces contact one another.

As used herein the term "gas permeable interstices" means irregular, network-like continuous channels which make the entire fill permeable to gas or water vapor.

Prefoamed polystyrene beads, which are preferably used with the invention, are known in the art. They are bead-like particles made by heating a foaming agent containing polystyrene granulate in a water bath to about 100° C. The thermoplastic polystyrene softens in the bath and is then foamed by the simultaneously evaporating or gas emitting foaming agent. After removal of the treated polystyrene from the bath, the foamed beads retain their shape and structure so that a large volume product with a light specific weight and good heat insulating capability is obtained.

The building blocks of the invention are produced by filling the cavities of hollow building blocks or hollow building block blanks with a loose fill of particles composed of a thermoplastic synthetic material, introducing at least one injection lance into the fill and blowing a hot gas through the lance until the surfaces of the particles are fused together. The preferred hot gas is steam having a temperature of 100° C. to 180° C. Experiments have shown that with a fill of prefoamed polystyrene beads the required solidification of the fill can be obtained, depending upon the steam temperature, in approximately the following times:

| Steam Temperature (°C.) | Steam Pressure in the Steam Generator (atmosphere gauge) | Time (seconds) |
| --- | --- | --- |
| 100 | 1 | 100 |
| 143 | 4 | 15 |
| 170 | 8 | 6 |

The listed values indicate that it is most advantageous to operate with saturated steam of about 8 atmospheres gauge and a temperature of about 170° C. Under these conditions, the fill of prefoamed polystyrene beads solidifies in about 6 seconds. This is a treatment time which can be used to advantage for the timed throughput of a plurality of blocks.

Steam-temperatures above 180° C. leads to treatment times of less than 5 to 6 seconds when using prefoamed polystyrene, which time is too short for handling under the present conditions.

An apparatus for practicing the method of the invention comprises at least one conveying device for the blocks to be treated, at least one filling station and at least one fusing station. The conveying device should preferably be a conveyor belt which is movable in steps in a predetermined rhythm although, instead of the conveyor belt, pallet carriages or the like, may be used.

The conveyor belt is loaded with hollow building blocks or the blanks therefor by means of a known apparatus with the cavities to be filled oriented in the vertical direction. It is advantageous to arrange the blocks in groups of about six blocks, each group consisting of two rows of three blocks each. After loading the belt in this way (different numbers of blocks and other arrangements are of course possible and depend upon the size of the blocks), the transporting device is advanced by a given amount so that the blocks enter the filling station.

The filling station includes at least one storage container filled with particles of thermoplastic material such as prefoamed polystyrene beads. On the underside of the storage vessel there are preferably a plurality of fill pipes whose arrangement corresponds to the arrangement of the chambers to be filled. It is also possible to arrange a plurality of storage containers each having only a single fill pipe. However, a common storage container having a plurality of fill pipes is more satisfactory.

The fill pipes are provided with lower and upper closing slides and have such dimensions that the volume of the pipes corresponds to the quantity of material to be placed in each chamber. The closing slides may be apertures or plates whose movements are controlled by electromagnets. Moreover, a shaking device may be provided at the storage container to assure that, when the upper slides are open, the thermoplastic particles enter the interior of the fill pipe, which serves as a measuring device, in an optimum manner. The proposed arrangement makes it possible to fill all chambers of the hollow building block, only one chamber or any desired number of chambers. Depending on the desired number and distribution of chambers to be filled, the closing slides of the applicable fill pipes are actuated and the remaining closing slides remain out of operation.

The fusing station includes at least one hot gas distribution chamber with a connected hot gas inlet and a hot gas valve, as well as at least one injection lance. A plurality of injection lances, in an arrangement which corresponds to the arrangement of the chambers to be filled, is preferred. It is also possible to provide each injection lance with its own hot gas inlet but such construction is more complicated and therefore is not preferred.

The injection lances are pipes which have a preferably cylindrical or conically tapered jacket, and are closed at the end of the pipe facing away from the hot gas distribution chamber. The jackets of the injection lances are provided with a plurality of bores distributed over their circumference and height. When the distribution chamber is lowered together with the injection lances, the lances are inserted into the chambers filled with plastic particles. Then the hot gas valve is opened and hot gas, preferably steam, flows into the fill for a predetermined time. The hot gas heats the thermoplastic particles mainly on their surfaces causing the particles to be fused together slightly but sufficiently.

Means are provided for synchronizing the movement of the conveying device, the storage container together with the fill pipes, and the hot gas distribution chamber together with the injection lances. The devices used to provide synchronization are preferably electrical or electronic and control, via a timer switch, the drives of the individual stations, the perforated baffles built into the fill pipes, the vibrator connected to the storage container and the hot gas valve of the fusing station. The arrangement may be provided with photoelectric cells to monitor the correct arrangement of the blocks and assure in this way that the fill station and/or the fusing station will not be lowered if, due to a malfunction, the blocks have not been placed onto the conveying device in the proper arrangement. The design of such devices is within the knowledge of the person of average skill in the applicable art so that a detailed description of the electronic circuitry is not required. Details of this circuit are not part of the present invention.

BRIEF DESCRIPTION OF THE DRAWINGS

FIG. 1 is a perspective view, partially in section, of a building block according to the invention.

FIG. 2 is an enlarged sectional view of the fill material placed in the block of FIG. 1.

FIG. 4 is an enlarged view of a fill pipe including the upper and lower perforated apertures.

FIG. 5 is a perspective view of an injection lance having a cylindrical shape.

FIG. 6 is a perspective view of an injection lance having a conically tapered shape.

DESCRIPTION OF THE PREFERRED EMBODIMENTS

Figure 3:
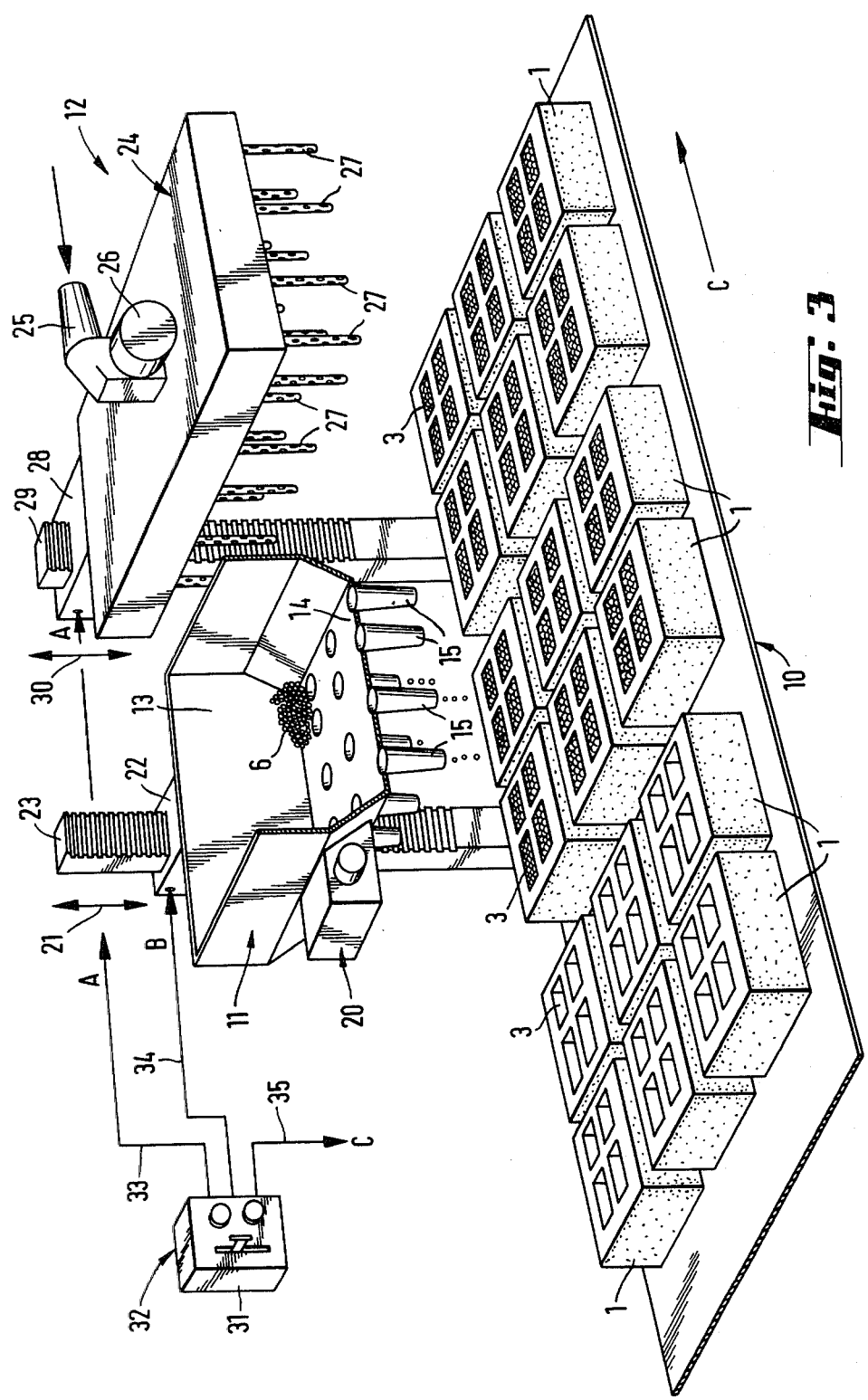
FIG. 3 is a perspective schematically simplified front view of the total system for producing the filled building blocks.

FIG. 1 shows a hollow building block 1 comprising a body 2 having a plurality of cavities 3 therein. In the illustrated embodiment, the cavities 3 are arranged in three rows and are of different sizes. They penetrate the body 2 of the block over its entire length and extend from load-bearing face 4 to load-bearing face 4' on the opposite side. The shape and arrangement of the cavities is not critical nor is the material of which the hollow building blocks are made.

In FIG. 1, one of the cavities 3 is shown partially cut open so that the fill 5 disposed in the interior of this cavity can be seen. The other cavities are filled in a corresponding manner, the fill being visible from the top.

FIG. 2 is an enlarged sectional view of the fill 5. As shown, the fill comprises a plurality of closely packed spherical particles 6. At their points of contact 7, the particles are connected or fused together, preferably by sintering, to form a firmly interconnected assembly penetrated by a network of gas or steam permeable channels 8. The purpose of channels 8 is to ensure that the fill and therefore, the entire hollow building block is highly permeable to gas or steam despite the greatly increased heat damping effect. More specifically, it has been found that the heat passage resistance $1/\lambda$ (measured in $m^2 h°CKcal$) for a wall thickness of 30 cm with plaster on both sides is increased from about 1.07 for the unfilled block to about 2.0 for the block filled according to the present invention. Consequently, the heat passage resistance is improved by roughly 100% while the diffusion resistance factor does not exceed a value of about 10.

Anchoring of the fill takes place by sintering the particles to each other and, in addition, by sintering the outer layer of particles to the walls of the cavities.

FIG. 3 shows in schematic representation a preferred embodiment of an apparatus for manufacturing blocks according to the present invention. The apparatus comprises at least one conveying device 10 for the blocks 1 to be treated, at least one filling station 11 and at least one sintering station 12.

In the illustrated embodiment, the conveying device 10 is a section of a conveyor belt, the return reach as well as the deflecting and drive devices not being shown for the sake of clarity. Instead of the conveyor belt, the conveying device may also be a train of pallet carriages or a similar arrangement. The important factor is that the blocks 1 to be treated are deposited on the conveying device in a predetermined and unchanging arrangement with the cavities 3 to be filled always oriented in the vertical direction. The special arrangement of six blocks in two rows of three blocks shown in FIG. 3 is by way of example only and may be replaced by a different arrangement.

In the illustrated embodiment, the filling station 11 comprises a storage container 13 having a plurality of fill pipes 15 projecting from its bottom side 14. The locations of the fill pipes 15 correspond to the locations of the cavities 3 to be filled and consequently depend on the arrangement of the blocks 1 on the transporting device 10. Thus, the locations of the fill pipes must always be the same for any given arrangement of blocks.

The storage container 13 is filled with thermoplastic particles 6 which are inserted in the cavities 3 by this part of the apparatus. To assure a uniform fill during operation of the apparatus, the inner volume of the fill pipes 14 may be used as a measuring vessel. For this purpose, the fill pipes are each provided with an upper closing slide 17 and a lower slide 16 as shown in the enlarged view of FIG. 4. The closing slides 17 and 16 are plates made for example of sheet metal which are moved back and forth by energizing and deenergizing electromagnets 18 and 19 respectively.

The storage container 13 is further provided with a shaking device 20 in order to assure that the pipes 15 will be filled uniformly to an optimal level. Container 13, together with all parts permanently connected thereto, can also be moved up and down in the direction of the double arrow 21 by positioning motor 22 which moves the entire full unit up and down with respect to column 23.

The sintering station 12 includes a hot gas distributing chamber 24 with connected hot gas inlet 25 and a hot gas valve 26. A plurality of injection lances 27 are connected to the underside of the hot gas distributing chamber 24, the arrangement of the lances corresponding to the arrangement of the cavities 3 to be filled. The hot gas distributing chamber can also be moved up and down in the direction of the double arrow 30 by a positioning motor 28 which engages a column 29.

The apparatus operates as follows

First, the hollow building blocks 1 to be filled are deposited on the conveying device in a predetermined arrangement which is fixed for each apparatus. At the same time, the upper slides 17 of the fill pipes 15 in the filling station 11 are opened and the shaking device 20 is placed in operation causing the fill pipes 15 to fill with plastic granulate. As soon as the filling process is completed, slides 17 are closed.

After the blocks 1 have been placed onto the conveying device 10, the conveying device 10 is advanced by a predetermined increment to bring them accurately and precisely below the fill pipes 15. The storage container 13, with all parts permanently attached thereto, is then lowered so that the fill pipes are positioned just above the cavities 3 to be filled. The lower closing slides 16 of the fill pipes 15 are opened and the contents of the fill pipes flow into the cavities 3. After the cavities are filled, the container 13 is moved upward by positioning motor 22. Simultaneously with this filling process, another group of blocks 1 are deposited on the transporting device to constitute the next charge.

At the end of these procedures, the transporting device advances by another increment so that the already filled blocks move below the sintering station 12 and the newly deposited blocks are positioned below the filling station. In the filling station, the newly deposited blocks are filled.

Simultaneously, the hot gas distributing chamber 24, together with the parts connected thereto is lowered by positioning motor 28 so that the injection lances 27 penetrate deeply into the cavities 3 of the blocks and thus into the fills. The hot gas valve 26 is then opened permitting hot gas in the form of steam to be introduced into the cavities and into the fill.

At the end of a predetermined period of time, the hot gas valve 26 is closed and the apparatus moved upward by positioning motor 28 completing the sintering process.

In order to assure that movement of all parts of the system is coordinated, the apparatus is provided with a synchronizing device 31 which controls the sequence of movement of the individual parts. Synchronization may be achieved with any suitable mechanical, electrical or electronic arrangement known in the art, the specific arrangement not forming a part of the invention. However, an electrical or electronic system is preferred and has been shown symbolically in FIG. 3. In FIG. 3, the synchronizing circuit is located in a box 32 and connected via leads 33, 34, 35 to the drive assemblies of the conveying device, filling station and sintering station respectively. In addition, box 32 may also include detecting devices which monitor, for example by means of photoelectric cells, the correct arrangement of the parts and switch off the apparatus or stations when malfunctions occur.

FIG. 5 shows an injection lance 27 consisting of a pipe 36 having a cylindrical wall which is closed at the end 37 remote from the hot gas distribution chamber. The wall is provided with a plurality of bores 38 distributed over its circumference and height. The wall of the injection lance shown in FIG. 5 also has a cylindrical shape so that the hot gas will be distributed uniformly therealong. However, the injection lances may also be broad and sword-like. In order to facilitate exchange, the lance is provided with a thread 39 at its upper end with which it can be screwed into the hot gas distributing chamber 24.

FIG. 6 shows another embodiment of the injection lance 27 wherein the pipe has a conically tapered wall. This pipe is also closed, preferably at the lower end 37, and the wall is provided with a plurality of nozzle-like bores which are distributed over its circumference and height. It is likewise possible to use lances which are open at the bottom.

It will be understood that the above description of the present invention is susceptible to various modifications, changes and adaptations, and the same are intended to be comprehended within the meaning and range of equivalents of the appended claims.

What is claimed is:

1. Apparatus for producing building blocks comprising
    conveying means for transporting building blocks each having at least one hollow chamber therein,
    a filling station for filling the chambers of said building blocks with particles of preformed thermoplastic synthetic material, a fusing station for fusing the surfaces of said particles of thermoplastic synthetic material together, and synchronizing means for controlling the movements of said conveying means, filling station and fusing station to fill the chambers of said building blocks with said particles of thermoplastic synthetic material and then fuse said particles together.

2. The apparatus defined in claim 1 wherein said conveying means is a conveyor belt.

3. The apparatus defined in claim 1 wherein said filling station comprises a storage container having a lower side for storing said particles of preformed thermoplastic synthetic material, and a plurality of fill pipes attached to the lower side of said container and projecting therefrom for filling each of the chambers in said building blocks with said particles, said blocks being positioned so that each of the chambers is below an associated fill pipe.

4. The apparatus defined in claim 3 wherein each of said fill pipes is provided with an upper and a lower closing slide, the volume of each pipe between said upper and lower slides corresponding to the quantity of particles to be placed in the associated fill pipe.

5. The apparatus defined in claim 4 which further comprises electromagnetic means for moving said upper and lower slides.

6. The apparatus defined in claim 3 wherein said filling station further comprises a shaking device to provide uniform filling of said fill pipes.

7. The apparatus defined in claim 1 wherein said fusing station comprises a hot gas distributing chamber, a hot gas inlet connected thereto, a gas valve for controlling the flow of hot gas into said hot gas distributing chamber, and at least one injection lance attached to said hot gas distributing chamber for injecting hot gas into the particles of preformed thermoplastic synthetic material in the chambers of said building blocks.

8. The apparatus defined in claim 7 wherein said injection lance comprises a pipe having a jacket closed at its end remote from said hot gas distributing chamber, said jacket being provided with nozzle-like bores distributed over its circumference and height.

9. The apparatus defined in claim 8 wherein said jacket is cylindrical.

10. The apparatus defined in claim 8 wherein said jacket is conically tapered.

11. Apparatus as defined in claim 1 wherein said conveying means is movable in the horizontal direction to transport said building blocks from said filling station to said fusing station, and wherein said filling and fusing stations are moveable in the vertical direction.

* * * * *